(12) United States Patent
Zhou et al.

(10) Patent No.: US 11,248,780 B2
(45) Date of Patent: Feb. 15, 2022

(54) LED DRIVER AND A LED MODULE FOR USE WITH THE DRIVER

(71) Applicant: SIGNIFY HOLDING B.V., Eindhoven (NL)

(72) Inventors: Yufei Zhou, Eindhoven (NL); Eugen Jacob De Mol, Eindhoven (NL); Maurice Lucien Eugene Casanova, Eindhoven (NL); Hengliang Luo, Eindhoven (NL); Dennis Johannes Antonius Claessens, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 17/059,951

(22) PCT Filed: Jun. 4, 2019

(86) PCT No.: PCT/EP2019/064396
§ 371 (c)(1),
(2) Date: Nov. 30, 2020

(87) PCT Pub. No.: WO2019/233969
PCT Pub. Date: Dec. 12, 2019

(65) Prior Publication Data
US 2021/0212183 A1 Jul. 8, 2021

(30) Foreign Application Priority Data

Jun. 4, 2019 (WO) ................ PCT/CN2018/090281

(51) Int. Cl.
*H05B 45/50* (2020.01)
*F21V 23/06* (2006.01)
*H05B 47/25* (2020.01)

(52) U.S. Cl.
CPC ............. *F21V 23/06* (2013.01); *H05B 45/50* (2020.01); *H05B 47/25* (2020.01)

(58) Field of Classification Search
None
See application file for complete search history.

(56) References Cited

U.S. PATENT DOCUMENTS

2002/0176262 A1 11/2002 Tripathi et al.
2009/0102399 A1 4/2009 Kita
(Continued)

FOREIGN PATENT DOCUMENTS

CN 204442787 U 7/2015
EP 2493267 A1 8/2012
JP 2010055824 A 3/2010

*Primary Examiner* — Anh Q Tran
(74) *Attorney, Agent, or Firm* — Daniel J. Piotrowski

(57) ABSTRACT

A LED driver comprises two output contacts (310, 311) and an additional contact (312) which enables detection of connection of the LED driver to a LED module (301). The LED driver has a normal current regulating mode and an open circuit protection voltage regulating mode. The LED driver is switched from the voltage regulating mode to the current regulating mode in response to the detection of connection of the LED module. This enables a LED module to be connected to the LED driver while it remains powered, in particular because the LED driver is placed in a voltage regulating mode prior to connection to the LED module.

12 Claims, 7 Drawing Sheets

(56) References Cited

U.S. PATENT DOCUMENTS

| | | | |
|---|---|---|---|
| 2011/0210675 A1* | 9/2011 | Hamamoto | H05B 45/3725 |
| | | | 315/185 R |
| 2011/0260648 A1* | 10/2011 | Hamamoto | H05B 45/14 |
| | | | 315/294 |
| 2013/0307416 A1 | 11/2013 | Xu et al. | |
| 2013/0320857 A1 | 12/2013 | Fu et al. | |
| 2016/0205732 A1* | 7/2016 | Zhuang | H05B 45/50 |
| | | | 315/307 |
| 2016/0270177 A1* | 9/2016 | Mishima | H05B 45/50 |

* cited by examiner

LED DRIVER AND A LED MODULE FOR USE WITH THE DRIVER

CROSS-REFERENCE TO PRIOR APPLICATIONS

This application is the U.S. National Phase application under 35 U.S.C. § 371 of International Application No. PCT/EP2019/064396, filed on Jun. 4, 2019, which claims the benefit of Chinese Patent Application No. PCT/CN2018/090281, filed on Jun. 7, 2018. These applications are hereby incorporated by reference herein.

FIELD OF THE INVENTION

This invention relates to LED drivers and LED modules.

BACKGROUND OF THE INVENTION

In the future, luminaires may not have a LED bulb or tube, but may instead comprise the LED driver and the LED module which are electrically connected. In some LED driver applications, hotwiring, i.e., connecting the LEDs of the LED module to a LED driver that is already operating, is required. This is similar to the situation now of changing a LED bulb or a LED tube in a luminaire which is live.

Typically, if the driver output is open circuit, the driver is running with an output capacitor charged up to the driver's open load voltage (open circuit voltage, or OCV) which may reach higher than the maximum loaded output voltage due to the fact that the driver still outputs substantial power which is then stored in the output capacitor.

FIG. 1 shows the output stage 1 of a LED driver, comprising the output capacitor 100, the LED load 101 and a switch 102 which represents the connection and disconnection of the LED load 101 to the driver. When the LED load 101 is re-connected to the output after it has previously been disconnected, equivalent to closing switch 102, the capacitor 100 with a higher voltage discharges through the LED load 101 causing an outrush current from the driver, or inrush current through the LEDs.

Due to the equivalent low ohmic dynamic resistance of the LEDs, an inrush current of several amperes or even tens of amperes could be expected in this hotwiring application. The high inrush current to the LEDs usually shortens the work life and harms the reliability of the LEDs. It can also cause dangerous safety issues.

It is known that it would be desirable to prevent any outrush current from being produced in the hotwiring process, and there are known solutions to the problem.

FIG. 2 shows the output stage 2 of a LED driver and shows an approach which involves placing a current limiting component in series with the LED load. The driver output capacitor is shown as 200. One capacitor terminal connects to a first output contact 210 of the driver. The LED load 201 connects between the first output contact 210 and a second output contact 211. The second output contact 211 connects to the other capacitor terminal through two parallel branches. The first branch is a transistor 220 and current limiting resistor 221 in series, and the second branch is a transistor 222.

When the LED load 201 is connected to the LED driver that is already operating, by plugging the LED load leads to the output terminals 210 and 211, the first branch 220, 221 is controlled as a current source with the transistor of the second branch turned off. The transistor 220 is a FET device which is operated in the channel-saturation mode (the gate source voltage Vgs controlling the drain current Id). After the voltage across the branch drops to a certain threshold, which means the charge stored in the output capacitor 200 is low enough to generate only a small and acceptable outrush current, the transistor 222 in the second branch is fully turned on such that it shunts the current source to reduce power dissipation.

However, the presence of a series device even during normal operation, namely transistor 222, is not ideal, as its power dissipation cannot be eliminated. This power dissipation is added to the overall power loss and thus lowers the lighting efficiency, which is never preferred in any condition.

There is therefore a need for an energy efficient way to prevent high inrush currents so that a LED module may be hotwired to an active driver.

SUMMARY OF THE INVENTION

The prior art has two contacts between the LED module and the LED driver. It is a concept of the invention to provide a three (or more) contact connection between the LED driver and the LED load, which is used to detect connection of the LED load. The LED driver has a current regulating mode and a voltage regulating mode, the voltage regulating mode is used whenever the LED module is disconnected, and the driver switches from the voltage regulating mode to the current regulating mode according to a detection on one contact of the three contacts.

The invention is defined by the claims.

According to examples in accordance with an aspect of the invention, there is provided a LED driver comprising first and second output contacts adapted to connect to, and power, a LED module in a first mode which is an output current regulating mode, wherein the LED driver comprises:

a third contact adapted to associate with different voltages depending on whether or not the LED driver is connected to the LED module;
a detection circuit to detect a voltage associated with the third contact; and
a controller,
wherein the LED driver has a second mode for open circuit protection which is an output voltage regulating mode with a regulation voltage,
wherein the controller is adapted to switch the LED driver from the second mode to the first mode in response to the detected voltage associated with the third contact.

This driver has a normal current regulating (first) mode for driving a LED module. In addition, it has an open circuit protection (second) mode. This second mode on the one hand prevents the LED driver from overloading, and on the other hand keeps the LED driver activated and enables a LED module to be powered and emit light as soon as it is connected to the LED driver, in particular because it is placed in a voltage regulating second mode. Detection of the connection of a LED module is based on a third contact, and this detection is used to switch from the open circuit protection mode to the normal current regulating mode of operation. The voltage regulating mode also enables the driver to provide a power supply to other components than the LED module, such as sensors or wireless communications modules.

This approach avoids the need for current limiting elements in series with the LED module, because at the time of connection of the LED module, the driver is in a (low) voltage regulating mode and there is no outrush current to the LED module.

The third contact is for example adapted to connect to the LED module directly, and the third contact and the second output contact are adapted to be short circuited by the correct connection of the LED module to the second output contact and the third contact.

The voltage associated with the third contact thus relates to shorting of the third contact to the second output contact when the LED module is connected. Detecting a short circuiting voltage is relatively easy and accurate, thus this embodiment provides a preferred implementation.

The first mode for example has a first output voltage threshold and the second mode is for regulating the output to a regulation voltage which is lower than the first output voltage threshold.

In this way, a high output voltage, for example caused by a current regulating driver attempting to drive current to an open circuit, is used to identify that the LED module is not connected. This high output voltage is the first output voltage threshold. It is only reached during an open circuit condition and when in the first mode. Then the output voltage is regulated at a lower voltage to avoid overloading the LED driver and outrush to a re-connected LED module.

The controller may be adapted to control the LED driver to switch from the first mode to the second mode when the first output voltage threshold is reached and to control the LED driver to discharge the output voltage to the regulation voltage.

When switching from the current regulating first mode to the voltage regulating second mode (with lower voltage), a controlled discharge of the output voltage (for example which is stored on an output capacitor) takes place and this provides a quick voltage regulation for safety.

The detection circuit may be adapted to detect a voltage between the third contact and the second output contact as the detected voltage associated with the third contact. The driver for example creates a voltage between these two contacts until they are shorted by connection to the LED module. This provides a convenient way to detect the connection or disconnection of the LED module.

An output capacitor may be provided, and the detection circuit is further adapted to detect whether an output voltage at the output capacitor reaches a first output voltage threshold.

By detecting the output voltage at the capacitor, an increased voltage (beyond a threshold) due to an open circuit condition can be detected. The controlled discharge of the output voltage (when switching to the lower voltage second mode) for example comprises operating a discharge element which is in parallel with the output capacitor.

The detection circuit may comprise a logic circuit for providing a signal to the controller to switch the modes based on both the voltage between the third contact and the second output contact and the voltage at the output capacitor.

The logic circuit processes the output voltage at the capacitor as well as the detection voltage relating to connection to the LED module. The logic circuit for example comprises a memory device such as a latch circuit which triggers (e.g. sets) when the high capacitor voltage is detected and triggers (e.g. resets) when the LED module connection is detected.

The third contact may be adapted to contact the LED module after the second output contact has made contact with the LED module. The LED module is thus connected to the LED driver circuit before the change of mode can take place back to the first operating mode. Thus, the open circuit protection mode remains in place until the final connection is made, to the third contact. This provides a safeguard mechanism against an improper connection between the LED module and the second output contact.

The first and second output contacts and the third contact are for example arranged to engage with the LED module such that the first output contact is adapted to contact the LED module before the third contact and the second output contact contact the LED module. The detection of the LED module connection is thus made when the LED module has been fully connected, to both the first and the second output contacts as well as after connection of the second output contact and the third contact together. This provides a safeguard mechanism against an improper connection between the LED module and the first/second output contact.

A first impedance may be provided between the third contact and the first output contact and a second impedance may be provided between the third contact and the second output contact. These impedances define a potential divider. They generate an output voltage when the LED module is not connected, and this output voltage changes because of shorting of one of the impedances when the LED module is connected.

A fourth contact may be coupled to the third contact, wherein said fourth contact is adapted to be coupled to the first contact upon a correct connection of the LED module to the first contact and before a correct connection of the LED module to the third contact.

The use of a four-contact arrangement enables the connection order of the two terminals of the connected LED module to be detected, because an order of connection to both output contacts can be detected. In this way, if the connection is in the wrong order, the current regulating mode is not initiated for safety.

Thus, the detection circuit may be adapted to detect an order in which the first and second contacts are connected to the LED module, and the controller is adapted to switch the LED driver to the first mode only for one connection order. Thus, random connection of the LED module can be tolerated and the current regulating mode will only be initiated after a correct connection order.

In this arrangement, a first impedance may be between the third contact and the fourth contact and a second impedance may be between the third contact and the second output contact. The potential divider is thus between the third and fourth contacts in this example, and the division ratio of the divider is adjusted according to the connection to the LED module. Thus, the connection can be detected by measuring a change in the output of the divider.

In an alternative embodiment, short wiring the third contact is replaced by a setting impedance. The third contact and the second output contact are adapted to be connected by a setting impedance of the LED module, upon the correct connection of the LED module to the second output contact (311) and the third contact, the LED driver further comprises a current source to inject a current to the third contact, and is adapted to set a nominal output current according to the voltage on the third contact;

the LED driver is further adapted to switch the LED driver
      from the second mode to the first mode if the voltage
      on the third contact is within a scope; and switch the
      LED driver to the second mode if the voltage on the
      third contact exceeds the scope.

In this embodiment, the setting impedance that is originally used for setting the nominal output current of the LED driver is re-used by the LED driver to determine whether the LED module is correctly connected and to switch between the normal current mode and the open protection mode. This provides an additional function by the existing nominal current setting interface. Note that this nominal current setting interface is not used for protection/open detection purpose so far.

The invention also provides a LED module comprising LED units, which module is to be used with a LED driver as defined above, the module comprising:
- a first and a second input terminal adapted to connect to the first and second output contacts of the LED driver,
- a third input terminal to contact the third contact of the LED driver, and
- a switch to change the voltage associated with the third input terminal upon an active voltage from the first input terminal.

This module has an additional switch which means that the third contact's voltage is changed, as explained above, only after the first output contact has already been correctly connected, so that the current regulating mode is then correctly initiated. The shorting is implemented by the switch which actively relies on the correct connection of the first output contact rather than by the pin connector design. This means the LED module also checks the connection to the first output contact. Only when connection is made to the first contact is the measurement of the third contact's voltage effective. This provides a further safety and it allows the first contact or the second/third contacts to be made in either order.

The switch is for example adapted to short circuit the second input terminal and third input terminal upon the active voltage from the first input terminal.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
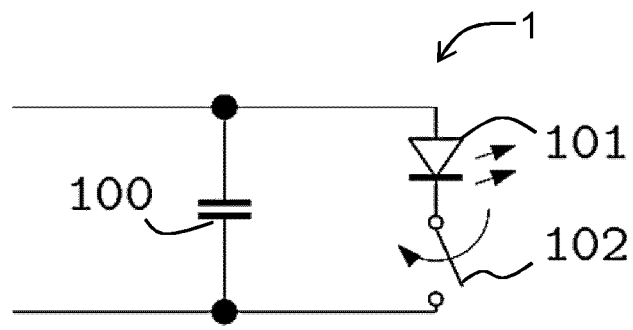
FIG. 1 shows a first example of a known output stage of a FED driver.
Figure 2:
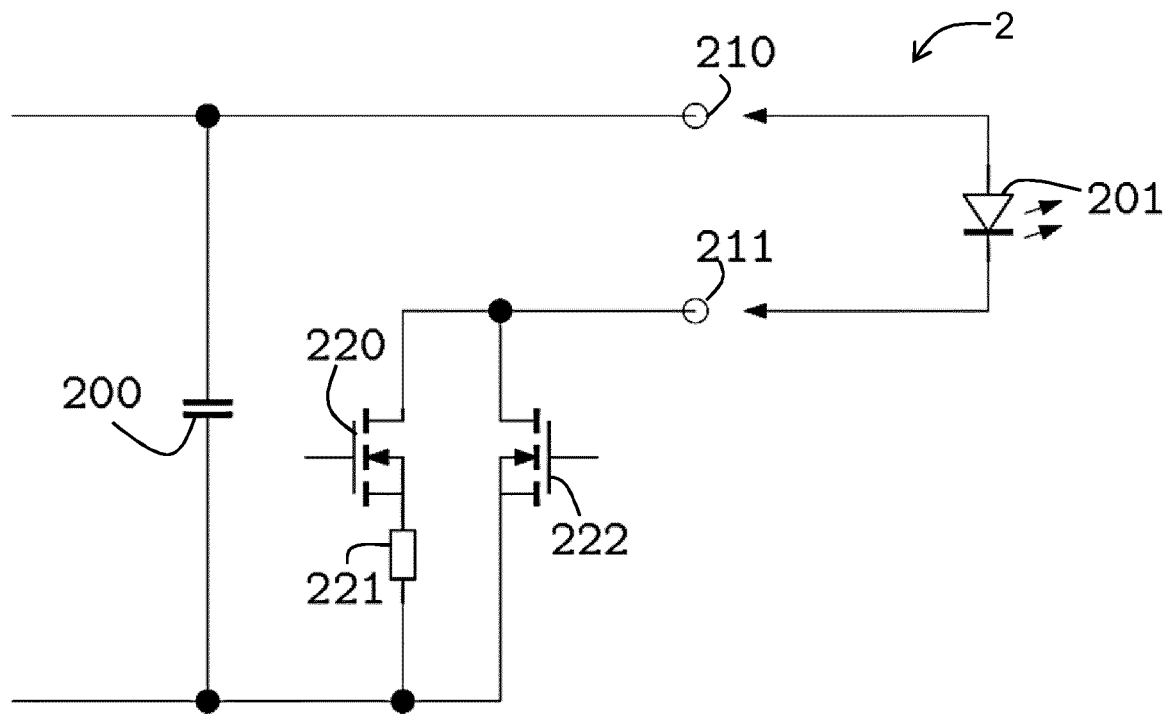
FIG. 2 shows a second example of a known output stage of a FED driver.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a LED driver which comprises two output contacts and an additional contact which enables detection of connection of the LED driver to a LED module. The driver has a normal current regulating mode and an open circuit protection voltage regulating mode. The LED driver is switched from the voltage regulating mode to the current regulating mode in response detection of connection of the LED module. This enables a LED module to be connected to the LED driver while the LED driver remains powered, in particular because it is placed in a voltage regulating mode prior to module connection.

Figure 3:
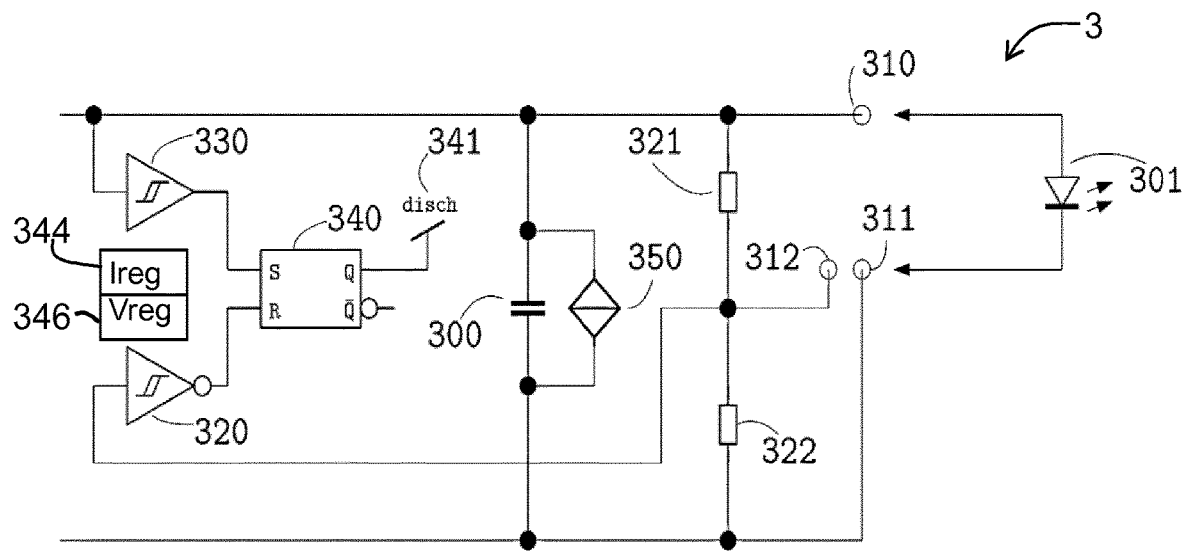
FIG. 3 shows a first example of a FED driver in accordance with the invention.

FIG. 3 shows a first example of a LED driver 3 in accordance with the invention. The driver output capacitor is shown as 300. One capacitor terminal connects to a first output contact 310 of the driver. The LED load 301 connects between the first output contact 310 and a second output contact 311. The second output contact 311 connects to the other capacitor terminal.

A resistor divider of a first impedance 321 and a second impedance 322 is provided between the first output contact 310 and the second output contact 311. These impedances define a potential divider. The output of the resistor divider connects to a third contact 312.

A controller 340, in this example in the form of a latch circuit, has two inputs. A first input is from the output voltage of the driver which is fed to a comparator 330 with a hysteresis structure (or a Schmitt trigger). A second input is from the voltage divider 321, 322 which is also fed to a comparator 320 with a hysteresis. An output signal 341 ("disch", standing for "discharging") is provided as output from the controller 340. It is used to control the discharge of the output voltage stored on the driver output capacitor 300 as explained below.

The driver provides a regulated output current when driving the LED load/module. A current regulator 344 is shown schematically for this purpose. A voltage regulator 346 is shown for a voltage regulating mode. The latch 340, regulators 344 and 346 and comparators 320 and 330 may be considered together to form part of the overall controller of the LED driver.

When the load is disconnected, the result of the regulated current driving is that the current continues to flow into the capacitor 300 and the comparator 330 detects that the output voltage increases above a first output voltage threshold. The latch circuit 340 is then set so that the output 341 (signal "disch") is taken to a value "1". The voltage regulating mode (for open circuit protection) is for regulating the output to a regulation voltage which is lower than the first output voltage threshold. Thus, once an open circuit has been detected based on a high output voltage being reached during current regulation, the mode switches to voltage regulation at a lower voltage.

The actual voltage levels will depend on the load being driven. The high voltage threshold will be higher than the normal forward voltage of the LEDs in the LED module, and the regulation voltage will be lower than that normal forward voltage. The regulation voltage is for example a required power supply voltage for other circuits such as sensors or wireless communication circuits to be powered by the LED driver. Thus, the voltage threshold may be tens or even hundreds of volts, whereas the regulation voltage may be less than 10V.

The voltage regulator 346 monitors the signal "disch" 341 and sets the regulation voltage (by setting a reference provided to the voltage regulator), to a suitable level below the first output voltage threshold, such that the low voltage power supply of the controllers or other circuits can still operate.

When switching from the current regulating mode to the voltage regulating mode (i.e. when the first output voltage threshold is reached) the LED driver discharges the output voltage stored on the capacitor 300 to the regulation voltage. For this purpose, a discharging element 350 such as a current source or dummy load is used to discharge the output capacitor 300. Note the discharging element 350 is an optional feature. It could also be that the LED driver will let the output capacitor leak charge to reach the regulation voltage.

The voltage divider associated with the third contact 312 is for sensing the connection between the LED driver and the LED/LED module. In this embodiment, the correction connection of the LED module would change the voltage division ratio, and if the output of the voltage divider 321, 322 drops below a certain threshold, the output signal "disch" is cleared such that the discharging of the output capacitor 300 stops, and the reference of the voltage controller is sets back to normal. This is in particular in response to the output voltage of the voltage divider, at contact 312, being pulled down to the negative output 311 by the connection to the LED module, as will be apparent from the description below.

The latch thus processes the output voltage at the capacitor as well as the detection voltage relating to connection to the LED module. The latch triggers (e.g. sets) when the high capacitor voltage is detected and triggers (e.g. resets) when the LED module connection is detected.

The circuit needs to be able to detect the insertion of the LED module 301. This is accomplished by the third contact 312, which forms a two-contact connector with the second output contact 311. The second output contact 311 and the third contact 312 are short-circuited when the LED is connected, and open-circuited when the LED module is removed.

In this way, every time the LED module is connected, the LED driver goes through a ramp-up process starting from a low regulated output voltage lower than the LED forward voltage, the LED driver increases its duty cycle and output power gradually so that the outrush current can be eliminated/reduced.

The third contact 312 is thus adapted to associate with different voltages depending on whether or not the LED driver is connected to the LED module. When the LED module is not connected, the contact 312 is at the normal voltage divider output and the voltage division ratio is $R_{322}/(R_{322}+R_{321})$, and when the LED module is connected, the contact 312 is pulled down to the low voltage rail, connected to the second output contact 311 and the voltage division ratio is zero.

The driver thus has a normal current regulating first mode for driving a LED module. In addition, it has an open circuit protection mode which is a voltage regulating second mode. A LED module can be connected to the LED driver while the LED driver remains powered in this mode. This avoids the need for current limiting elements in series with the LED module, because at the time of connection of the LED module, the driver is in a (low) voltage regulating mode.

When the LED module is removed, the output voltage is higher than a threshold, so the comparator 330 outputs 1, the comparator 320 with an inverter outputs 0, thus the latch 340 outputs 1 "disch", to discharge the output voltage and control the LED driver to enter voltage regulation mode. After the discharging, the output voltage is lower than the threshold, the comparator 330 outputs 0, but the latch circuit 340 still outputs the previous output which is 1 and keeps the voltage regulation mode. The latch circuit 340 would output zero upon the reset input R changing to 1, meaning the voltage on the third contact 312 is zero which is caused by a correct connection of the LED module. The zero output of the latch circuit would disable the discharging and also control the LED driver to enter the current regulation mode.

Figure 4:
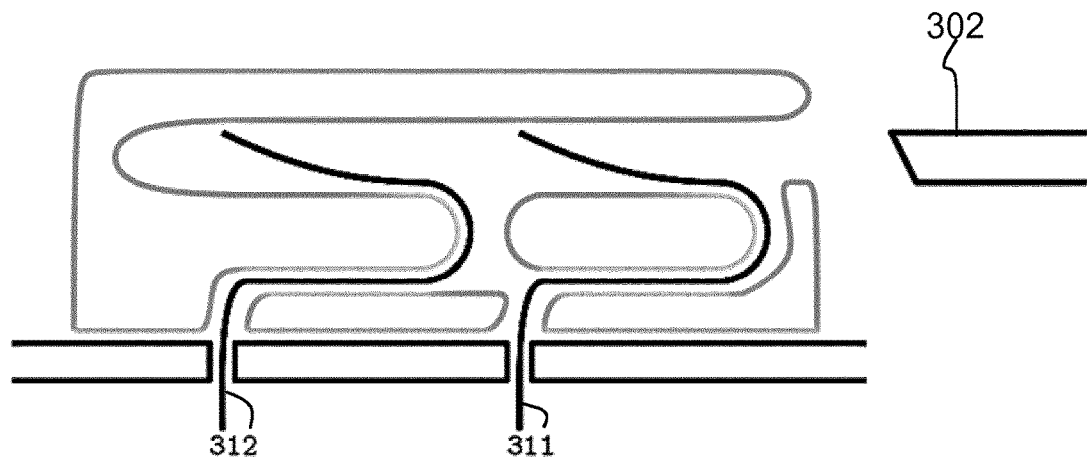
FIG. 4 shows a general two-contact connector which may be used in the driver of FIG. 3.

The design requires connection to the LED module to form a short between the contacts 311 and 312. FIG. 4 shows a general two-contact connector which can achieve this aim. The pin 302 is one terminal (negative input) of the LED module designed to fit mechanically with the two-contact connector of the contacts 311 and 312. Upon insertion into the connector, it first contacts a wire which is connected to the contact 311 and then contacts a wire which is connected to the contact 312 (as well) thereby connecting the two contacts together. This mechanical structure, which allows only an earlier connection of the second contact 311, is for preventing that the LED driver enters the current regulating mode before the real current loop via the second contact 311 is formed.

The connector needs to reliably short circuit contacts 311 and 312 when the LED module is plugged in. Furthermore, connection should be made to contact 310 before short-circuiting 311 and 312. This is because as soon as the short circuit is detected, the LED module should be fully ready to receive a regulated current, i.e. the other contact 310 should already be connected.

If a two-contact connector is used, and which can be connected in either order (for example if there are two separate connectors which can be connected in either order), then the connected needs to be in the correct order for the mode switching to take place correctly.

Figure 14:
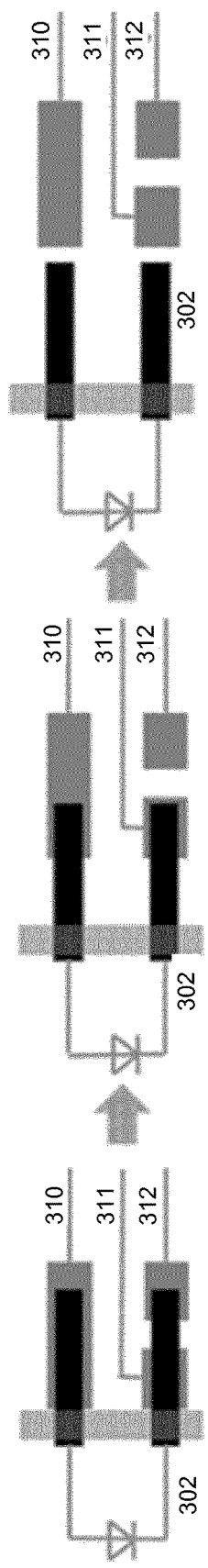
FIG. 14 schematically shows the contacts' connection upon the removal of the FED module, in an embodiment as shown in FIG. 4.

FIG. 14 shows the contacts' connection upon the removal of the LED module; and the other way around shows the connection upon the attach of the LED module. The darker blocks connected to the anode and cathode of the LED are the positive contact and negative contacts of the LED module. Especially, the negative contact is 302. In the left figure, the LED module is correctly connected to the driver wherein the positive contact of the LED module connects to the positive output 310 of the driver; and the negative contact 302 connects to both the negative output 312 and the third contact 311. As illustrated above, since the negative output 312 and the third contact 311 are shorted and the third contact receives the ground voltage, the driver would be in normal current mode. In the middle figure, the LED module is being removed, the third contact 311 is first disconnected from the negative contact 302 and the negative output 311 such that its voltage changes from ground to a certain voltage. The driver would exit the normal current mode and enter open protection mode. In the right figure, the LED module is completely removed.

To ensure a correct connection order, a three contact connector may be used. In this way, the connector itself defines the order in which electrical connections are made.

Figure 5:
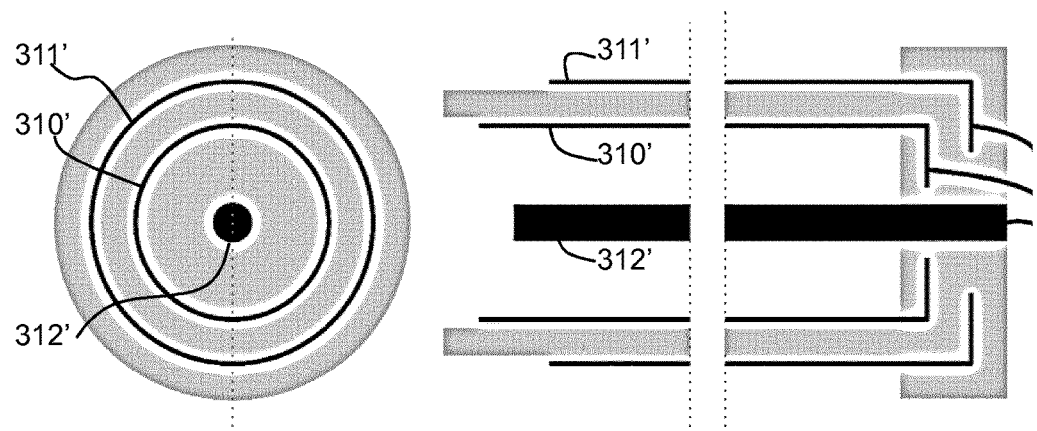
FIG. 5 shows a male connector in end view and in cross section.

FIG. 5 shows a male connector in end view and in cross section, having three concentric terminals of different length. The inner terminal 312' is on the central axis, and the middle terminal 310' and outer 311' terminal are concentric. The middle terminal 310' projects furthest forward so makes contact first with a female connector. Thus, it is suitable as the LED module terminal 310' for contacting the LED driver first output contact 310. The inner terminal 312' projects slightly further back so makes contact next with a female connector. Thus, it is suitable as the LED module terminal 312' for contacting the LED driver third contact 312. The outer terminal 311' projects furthest back so makes contact last with a female connector. Thus, it is suitable as the LED module terminal 311' for contacting the LED driver second output contact 311.

Note that in an alternative embodiment (shown in FIG. 11) the contacts 311 and 312 may make contact in either order since only when both are connected will the voltage divider output be pulled down to the low voltage rail (as explained further below).

Figure 6:
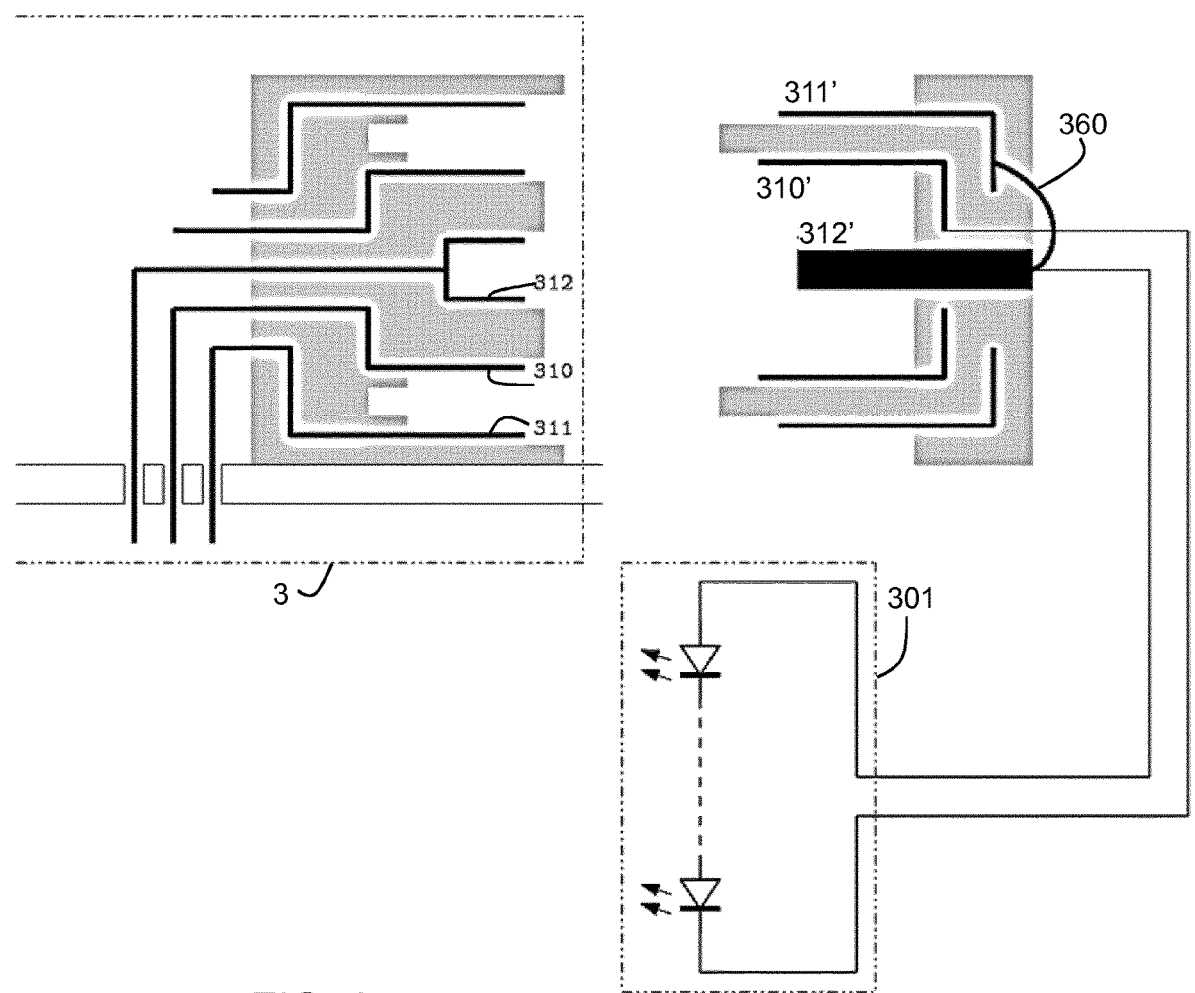
FIG. 6 shows the male connector of FIG. 5 used for the FED module and a female version for the FED driver.

FIG. 6 shows the connector of FIG. 5 used for the LED module 301, and a female version (with all three contacts terminating at the same longitudinal extent) for the LED driver 3. In this LED module, the contact 312' and 311' are short circuited by a wire 360.

This three contact connector provides a safe mechanical structure of the connectors to avoid unintentional or premature short circuiting between the connector 311 and 312. The short circuit between contacts 311 and 312 takes place in the male connector by the last connection of 312 and 312'. Thus, only when both connections 311/311' and 312/312' are made will the voltage divider output be pulled down.

This design requires a three pin connector for the LED module, which is not standard. The use of a three contact connector however ensures that the connector can only be joined in one way.

Figure 7:
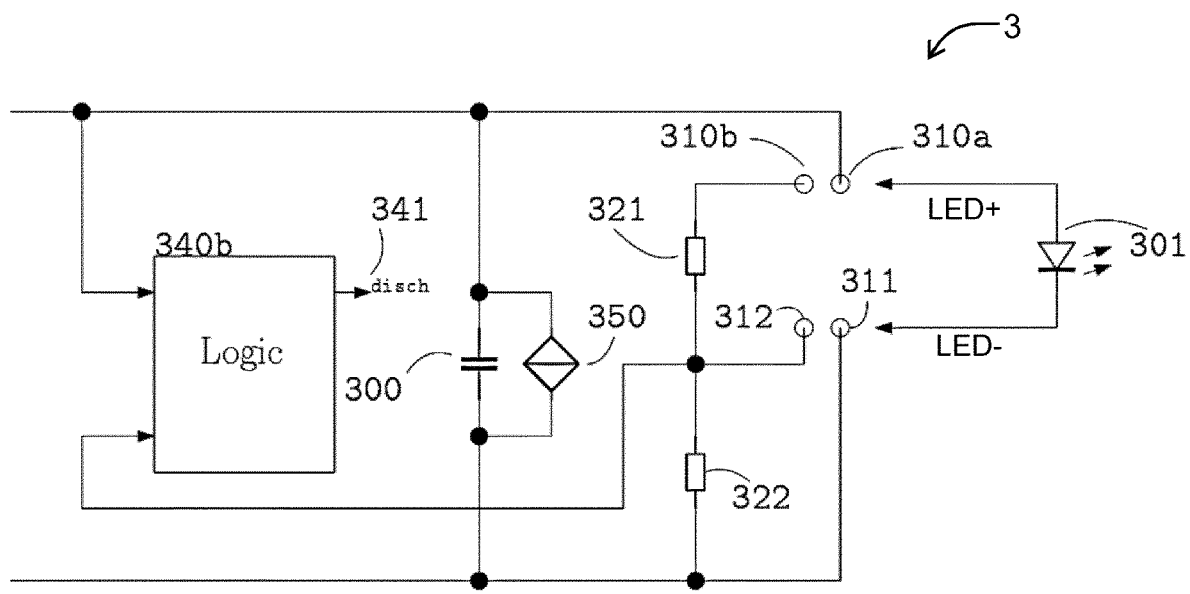
FIG. 7 shows a modification to the circuit of FIG. 3 which allows a two pin connector, and one which can be connected with either pin first.

FIG. 7 shows a modification to the circuit of FIG. 3 which allows a two pin connector, and one which can be connected with either pin first. By requiring only two lead wires from the LED module the total system cost is reduced, but such a system needs to be able to tolerate a random order of insertion of the two lead wires.

The same components as in FIG. 3 are given the same reference numbers and the description is not repeated.

The contact 310 is split into two contact portions, 310a and 310b (i.e. the first output contact is 310a and there is a new fourth contact 310b). The control logic 340b is modified compared to the latch 340 of FIG. 3 such that a voltage rising at the third contact 312 above an arming voltage Varm must be detected before it falls below a firing voltage Vfire, where Varm>Vfire.

During correct insertion, the third contact 312 first is pulled to the voltage divider output (when 310a and 310b are connected) with a certain value above zero then it is pulled down to the low voltage rail (when 311 and 312 are connected) with a substantial zero voltage.

If the end user inserts the cathode lead wire (LED-) before the anode lead wire (LED+), the "arm-fire" process is missing and the output capacitor 300 is kept at a low voltage. During incorrect insertion, the contact 312 first is pulled to the low voltage (when 311 and 312 are connected) directly and never goes up. At the output of the voltage divider, the voltage is always zero.

Thus, only the correct order of insertion leads to the current regulating mode, without outrush current. This enables a conventional LED module to be used with two separate lead wires instead of requiring replacement with a three contact power adaptor type cable. If connection is in the wrong order, the LED module will not function, and the user will need to disconnect and reconnect in the correct order.

The fourth contact 310b is coupled to the third contact 312 through the top impedance 321 of the voltage divider. The fourth contact 310b is adapted to be coupled to the first output contact 310a upon a correct connection of the LED module to the first contact 310a and before a correct connection of the LED module to the third contact 312. Thus, the intended connection order is to connect 310a and 310b and then to connect 311 and 312.

In this design, the first impedance 321 of the voltage divider is between the third contact 312 and the fourth contact 310b and the second impedance 322 of the voltage divider is between the third contact 312 and the second output contact 311.

The use of a four-contact arrangement enables the connection order to the LED module to be detected, because connection to both output contacts can be detected. In this way, if the connection is in the wrong order the current regulating mode is not initiated, because the output of the voltage divider is always zero and the LED driver is not aware of whether the LED module is or is not correctly connected to receive the current. Thus, the controller is adapted to switch the LED driver to the first mode only for one connection order. Thus, random connection of the LED module can be tolerated.

The logic inside the controller 340b may be implemented by a finite-state machine such as an algorithm in a microcontroller.

Figure 8:
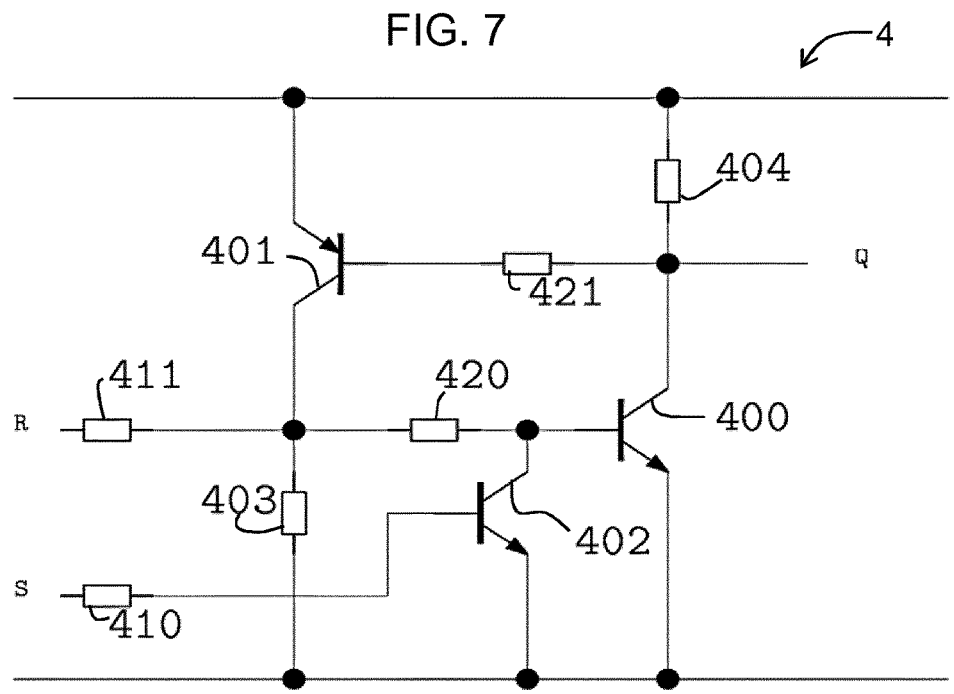
FIG. 8 shows a set-reset latch 4 which may implement the latch of FIG. 3.

For completeness, FIG. 8 shows a set-reset latch 4 which may implement the latch 340 of FIG. 3. It comprises a set of transistors 400, 401, 402 and resistors 403, 404, 410, 411, 420, 421. It has a set input S, a reset input R and a latch output Q. This is a discrete circuit implementation but of course an integrated circuit may be used. The circuit of FIG. 8 is a standard SR latch circuit and will not be described in full, as it will be well known to those skilled in the art.

Figure 9:
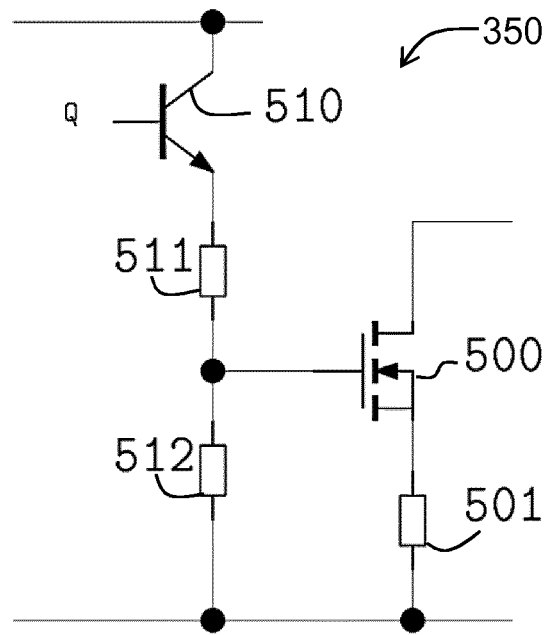
FIG. 9 shows an example of the discharging element in the form of a current source circuit for use in the circuits of FIG. 3 or 8.

FIG. 9 shows an example of the discharging element 350 in the form of a current source circuit. The transistor 510 is turned on by the latch circuit, which then sets an output voltage at the junction of a potential divider 511,512.

This voltage is supplied to the gate of a FET device 500 and turns it on to draw a predetermined current from the capacitor 300 (FIG. 3) through a resistor 501. When the capacitor voltage has dropped to the potential divider voltage, the potential divider 511,512 outputs a low voltage that turns off the MOSFET 500, and the capacitor stops discharging. Thus, the transistor 500 functions as a current source that discharges the capacitor to a set level after the removal of the LED module.

Figure 10:
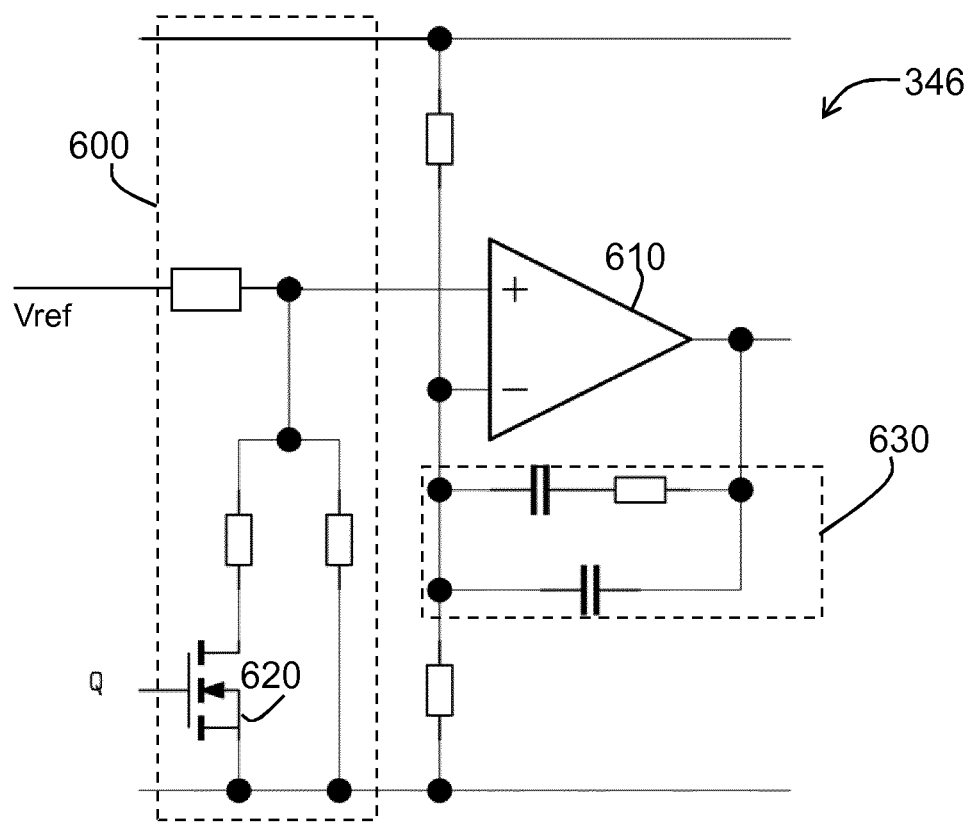
FIG. 10 shows an example of a voltage regulator for use in the circuits of FIG. 3 or 8.

FIG. 10 shows an example of the voltage regulator 346 with a switchable reference.

A potential divider 600, between a reference Vref and ground, sets the voltage to the non-inverting input of a comparator 610. The set voltage depends on the switching state of transistor 620 which sets the lower impedance of the voltage divider to be either one resistor or two resistors in parallel. The comparator 610 has a negative feedback path 630 which regulates the output in dependence on the input provided to the non-inverting input.

Thus, two voltage regulation output are generated, depending on the state of transistor 620, which is controlled by the latch circuit 340.

The examples above enable connection to a standard LED module, either with a standard two pin layout or a three pin connector.

Figure 11:
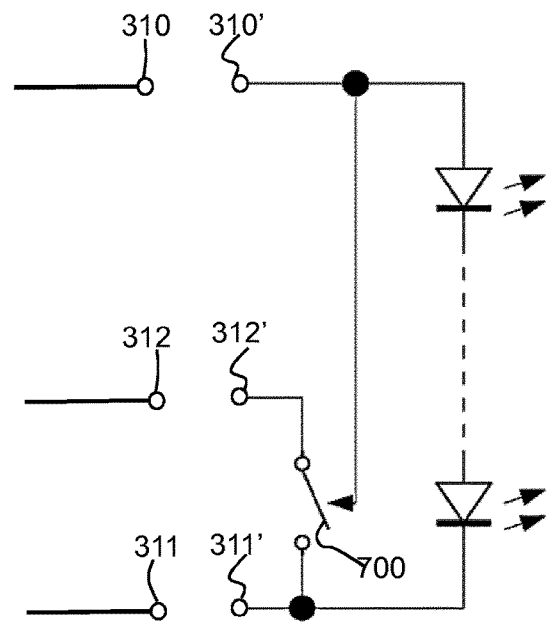
FIG. 11 shows a possible modification to the FED module using a switch to implement the short circuit function.

FIG. 11 shows a possible modification to the LED module in which a first input terminal 310' and a second input terminal 311' are adapted to connect to the first 310 and second 311 output contacts of the LED driver.

The connection between the driver and the module is three pins. The shorting between contacts 311 and 312 is implemented in the LED module rather than by the pin connector design.

A third input terminal 312' is to contact the third contact 312 of the LED driver. A switch 700 is provided to change the voltage associated with the third input terminal 312' upon an active voltage from the first input terminal 310'.

Thus, if the connection is first made to the first input terminal 310', the connection provides a control signal to the switch 700 which then immediately implements the shorting of the second and third input terminals 311' and 312'. This arrangement means connection of the LED module can be tolerated with either terminal making contact first. If the first output contact 310 is connected first, the short circuiting between the second output contact and the third contact is forced by the switch.

If the second output contact 311 is connected first before the first output contact 310, the shorting between the second output contact 311 and the third contact 312 still does not happen until it is forced by the switch when the first output contact 310 makes its connection.

Thus, different connection orders can be tolerated, and the current regulating mode can be established for those different orders, rather than requiring disconnection and reconnection as in the examples above.

The discussion above assumes that the LED module is always connected with the correct polarity. In particular, the mechanical connector designs may ensure that this is always the case. Thus, the protection systems above ensure only that the correct connection order is ensured.

The detection of connections and resulting voltages and currents may also be used to detect the polarity of the connected LED module, and thus prevent the current regulating mode when the LED module is incorrectly connected.

Figure 12:
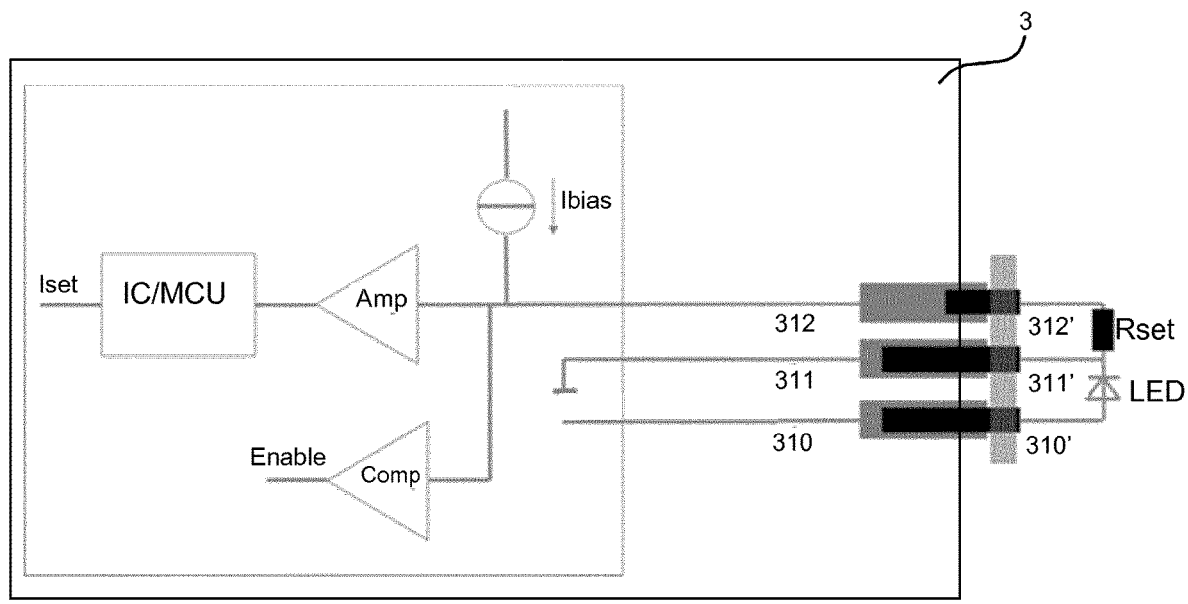
FIG. 12 shows another embodiment of the invention that reuses the Rset of the driver to detect the presence of the FED module and switches between normal mode and protection mode.

In an alternative embodiment, an Rset interface between the LED driver and the LED module is re-used for detecting the presence of the LED module and make the LED driver switch between normal current mode and open protection mode. This embodiment is shown in FIG. 12.

Rset interface is a well known interface for setting the nominal output current of the LED driver. At the LED driver side, besides the positive output contact 310 and negative output contact 311, a third contact 312 is used for connecting to an end of a setting impedance in the LED module, shown as 312'. The other end of the impedance could connect the either of the two input contacts of the LED module, and in this embodiment it connect to the negative input contact 311'. A bias current source injects a bias current Ibias through the third contact 312 and the negative output contact 311. Normally, the LED driver detects the presence and value of the Rset during startup, by detecting the voltage across the contacts 312 and 311. If there is voltage, the voltage is processed by an amplifier AMP and sent to the MCU or IC to determine the set current Iset of the LED driver; if there is no voltage, the MCU or IC would also operate in normal current mode with a default/minimum output current. Note that the setting impedance Rset is a fixed resistor or is once-for-all configured thus is not likely to change in the operation of the LED module. Also, the Rset interface has not be considered as a means for any protection purpose. This Rset interface is quite different from the temperature protection interface based on the above facts, which temperature protection interface has varying impedance during the operation of the LED module.

Figure 13:
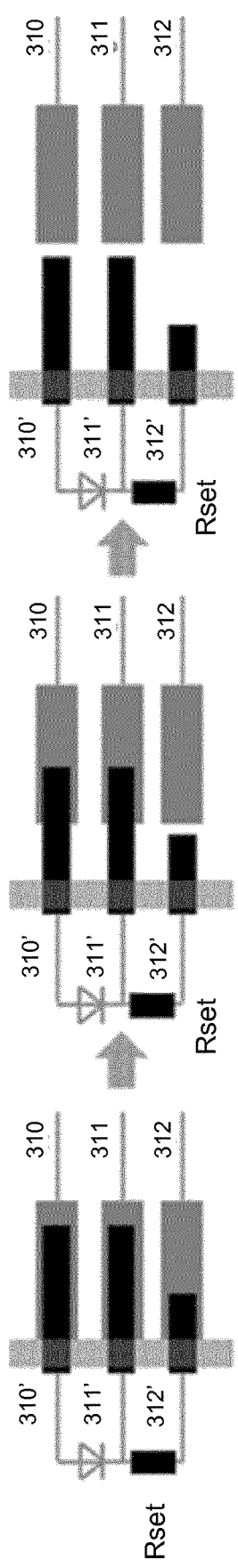
FIG. 13 schematically shows the contacts' connection upon the removal of the FED module, in an embodiment as shown in FIGS. 5 and 6.

The embodiment proposes to detect the presence of the LED module and switches between the normal current mode and open protection mode according to the voltage on the third contact 312 (with respective to ground 311) which is to be connected to Rset of the LED module. As shown in FIG. 12, an extra comparator Comp is used for detecting the voltage on the third contact 312. The contacts are also shaped so that the third contact 312 and the contact 312' are the last to connect upon connecting the LED module, and first to disconnect upon the removal. In the FIG. 12 and the left figure of FIG. 13, the voltage on the contact 312 is Rset*Ibias, and comparator Comp determines this voltage is within a threshold and output an enable signal=1, and the driver works in normal current mode. In the middle figure of FIG. 13, the contacts 312 and 312' are firstly disconnected. If the voltage on the contact 312 become large, when the comparator Comp determined that the voltage excessive a threshold, it outputs the enable signal=0. The driver would see Rset as not present and neither is the LED module, thus the driver would exit the normal current mode and enters the open protection mode. In the right figure of FIG. 13, all the contacts are completely disconnected.

The driver can be configured flexibly how it would react with the absence of the Rset on the third contact: either as the traditional driver that output a default current, or as the proposed embodiment that enters the open protection mode. For example, a maintenance signaling can be sent to the driver indicating that the LED module is to be replaced, and the driver would react as the proposed embodiment thus it is safe when the LED module is hot plugging out and in; after the maintenance, a signaling can be sent to the driver again and request the driver to react in traditional manner: outputting a default/minimum current even if the Rset is not present.

It is noted that the term "contact" is used for the driver output pins and the term "terminal" is used for the LED module input pins. This difference is terminology is to assist in the clarity of the text, but is essentially arbitrary.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of

The invention claimed is:

1. A LED driver comprising first and second output contacts adapted to connect to a LED module and the LED driver is adapted to power the LED module in a first mode which is an output current regulating mode wherein the LED driver is adapted to regulate the output current of the LED driver to the LED module through the first and second output contacts, wherein the LED driver comprises:
 a third contact adapted to receive different voltages depending on whether or not the LED driver is connected to the LED module;
 a detection circuit to detect a voltage associated with the third contact; and
 a controller,
 wherein the LED driver has a second mode for open circuit protection which is an output voltage regulating mode wherein the LED driver is adapted to regulate the output voltage of the LED driver across the first and second output contacts,
 wherein the controller is adapted to switch the LED driver between the second mode and the first mode in response to the detected voltage received on the third contact, wherein
 the third contact and the second output contact are adapted to be connected by an external setting impedance of the LED module or short circuited, upon the correct connection of the LED module to the second output contact and the third contact,
 the LED driver further comprises a current source to inject a current through the third contact and the second output contact and is adapted to set a nominal output current of the LED driver according to the voltage on the third contact;
 and the controller is further adapted to
 switch the LED driver to the first mode if the voltage on the third contact is within a threshold; and
 switch the LED driver to the second mode if the voltage on the third contact exceeds the threshold.

2. A LED driver as claimed in claim 1, wherein the LED driver, in the first mode, has a first output voltage threshold, and the LED driver, in the second mode, regulates the output voltage to the regulation voltage which is lower than the first output voltage threshold.

3. A LED driver as claimed in claim 2, wherein the controller is adapted to control the LED driver to switch from the first mode to the second mode when the output voltage of the LED driver reaches the first output voltage threshold and to control the LED driver to discharge the output voltage to the regulation voltage.

4. A LED driver as claimed in claim 1, wherein the detection circuit is adapted to detect a voltage between the third contact and the second output contact as the detected voltage associated with the third contact.

5. A LED driver as claimed in claim 3, comprising an output capacitor and wherein the detection circuit is further adapted to detect whether an output voltage at the output capacitor reaches the first output voltage threshold.

6. A LED driver as claimed in claim 5, wherein the detection circuit comprises a logic circuit for providing a signal to the controller to switch the LED driver between the first and second modes based on a voltage between the third contact and the second output contact and the output voltage at the output capacitor.

7. A LED driver as claimed in claim 1, wherein the third contact is adapted to contact the LED module after the second output contact has contacted the LED module.

8. A LED driver as claimed in claim 1, wherein the first and second output contacts and the third contact are arranged to engage with the LED module such that the first output contact is adapted to contact the LED module before the third contact and the second output contact contact the LED module.

9. A LED driver as claimed in claim 1, wherein a first impedance is between the third contact and the first output contact and a second impedance is between the third contact and the second output contact.

10. A LED driver as claimed in claim 1, comprising a fourth contact coupled to the third contact, wherein said fourth contact is adapted to be coupled to the first contact upon a correct connection of the LED module to the first contact and before a correct connection of the LED module to the third contact.

11. A LED driver as claimed in claim 10, wherein the detection circuit is adapted to detect an order in which the first and second contacts are connected to the LED module, and the controller is adapted to switch the LED driver to the first mode only for one connection order.

12. A LED driver as claimed in claim 10, wherein a first impedance is between the third contact and the fourth contact and a second impedance is between the third contact and the second output contact.

* * * * *